Jan. 13, 1925.
I. D. PERRY, JR
1,522,648
BUMPER FOR VEHICLES
Filed July 10, 1924
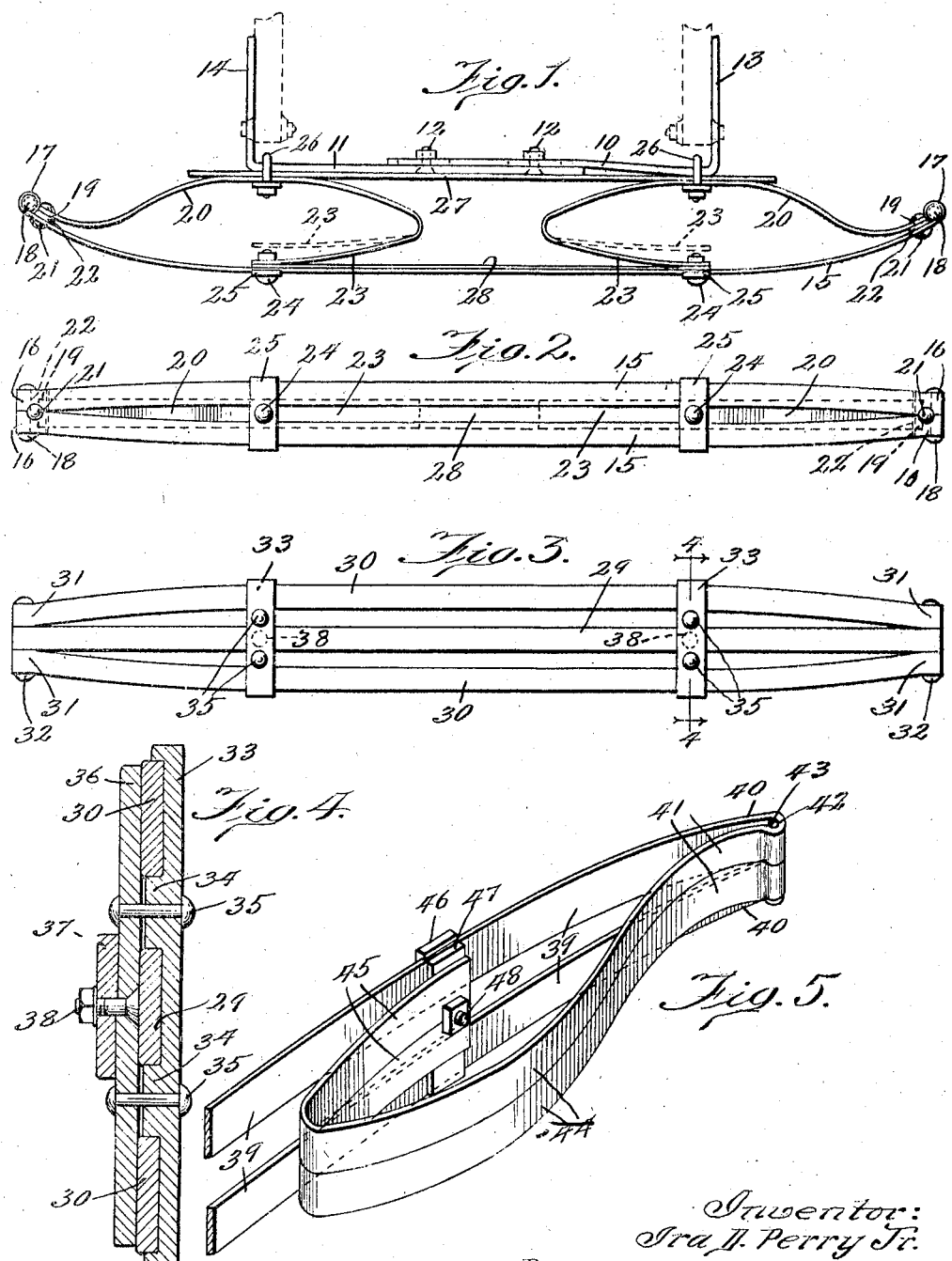
Inventor:
Ira D. Perry Jr.

Patented Jan. 13, 1925.

1,522,648

UNITED STATES PATENT OFFICE.

IRA D. PERRY, JR., OF CHICAGO, ILLINOIS.

BUMPER FOR VEHICLES.

Application filed July 10, 1924. Serial No. 725,140.

*To all whom it may concern:*

Be it known that I, IRA D. PERRY, Jr., a citizen of the United States, residing at Chicago, in the county of Cook and State of Illinois, have invented certain new and useful Improvements in Bumpers for Vehicles, of which the following is a specification.

This invention relates to improvements in bumpers for vehicles and more particularly motor vehicles, and which bumper is of the bar type including a spring bumper bar which extends transversely of and in advance of the vehicle, and one of the objects of the invention is to provide an improved bumper of this character having increased rigidity and which will at the same time be sufficiently resilient to resist the impact of an object or other vehicle and thereby prevent the bumper from becoming damaged.

A further object is to provide a bumper of this character having improved means for strengthening the ends as well as the intermediate portion of the bumper.

A further object is to provide for the bumper improved supporting means adapted to compensate varying widths of vehicles.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which:

Figure 1 is a top plan view of an improved bumper of this character constructed in accordance with the principles of this invention and showing the same attached to the chassis of a vehicle, the latter being in dotted lines.

Figure 2 is a front elevation of Figure 1.

Figure 3 is a view similar to Figure 2 of another form of the invention.

Figure 4 is an enlarged detail, vertical, sectional view on line 4—4, Figure 3.

Figure 5 is a detail perspective view of one end of another form of bumper.

In the accompanying drawing the supporting means for the bumper is preferably of a construction embodying two members 10 and 11 which overlap and the overlapping ends are adjustably connected in any suitable manner preferably by means of fastening devices 12. The other ends 13 and 14 respectively of the members 10 and 11 are adapted to be secured to the frame of the vehicle in any desired or well-known manner.

The bumper proper consists, in the form of the invention shown in Figures 1 and 2, of two co-planar resilient or spring bar members 15 which are spaced from each other a suitable distance and are of a length to extend across the front and beyond the sides of the vehicle. The ends 16 of the members 15 are deflected towards each other so as to contact at the extremities of the ends. The deflected ends 16 serve not only to cause the bumper to have a more pleasing appearance but also serve as a means for holding the intermediate portion of the members 15 spaced. The extremities of the members 15 are bent back upon themselves to form eyes or loops 17 which register with each other and through these registering eyes or loops strengthening and fastening means 18 pass. The members 15 thus shaped and connected together constitute the bumper bar and connected with each of the extremities of the bar, preferably in close proximity to each of the eyes 17, is one end 19 of a spring 20. The end 19 may be secured to the bar in any suitable manner preferably by means of a fastening device 21 and if desired a spacing member 22 may be interposed between the extremity of the spring 20 and the adjacent portion of the bar 15, the fastening device 21 passing through the end of the spring, the spacing member 22 and the bar 15. The other end 23 of the spring is bent back upon itself and spaced from the body thereof and is adapted to engage and rest against the rear face of the bars 15. This end 23 may be detached from the bars 15 or if desired may be secured by means of a suitable fastening device 24, which preferably passes through a clip 25 and the end of the spring.

The spring 20 is of a width to more than span the opening between the bars 15, as shown more clearly in Figure 2, and inasmuch as one end of the spring 20 stands in close proximity to the extremity of the bars 15, it will be manifest that the end of the bumper will be re-enforced or braced. The springs 20 are secured respectively to the members 10 and 11 of the hanger in any suitable manner preferably by means of U bolts 26 which engage the respective springs 20 intermediate their ends and if desired a re-enforcing bar 27 may also be provided between the hangers and the respective springs 20.

The hangers co-operate with the bar 27 to re-enforce the springs 20. If desired a re-enforcing bar 28 may be provided adjacent the rear face of the bars 15, the extremities of the bar 28 terminating between the ends of the respective springs 20 and the bars 15, and the bar 28 may be held in position by means of the fastening device 24.

In the form of the invention shown in Figure 3, there is provided an intermediate bar 29, and the bars 30 which are arranged on opposite sides of the intermediate bar 29 are shaped similar to the bars 15 and are held spaced from each other and from the intermediate bar by means of the deflected extremities 31. The extremities of all of the bars 29 and 30 may be held together by a suitable re-enforcing or fastening device 32 similar to the re-enforcing device 18.

Suitable fastening clips 33 may be provided adjacent the front face of the bars 29—30 and these clips 33 are preferably provided with shoulders 34 which enter the spaces between the adjacent bars 29—30. Fastening devices 35 pass through the shouldered portions 34 of the clips 33 and also through a bar 36 which may be provided adjacent the rear faces of the bars 29 and 30. The bar 36 may be secured to the respective hanger elements 37, which correspond with the elements 10 and 11 in Figure 1, by means of suitable fastening devices 38. The bars 29 and 30 of the form of the invention shown in Figure 3, may be re-enforced and strengthened in the same manner as the form shown in Figure 1.

In the form of the invention shown in Figure 5, the bumper bars 39 are deflected at their extremities 40 similarly to the bars 15 so that the ends of the bars 39 will engage to hold the body portion of the bars 39 spaced. The extremity of each of the bars 39 is bent back upon itself as at 41 to form a loop or eye 42 at the end of the bumper and a strengthening or re-enforcing element 43, such as a pin or the like is provided and inserted in the loop thus formed for strengthening the end of the bumper. The end of the portion 41 which is bent back upon itself is first deflected in a direction toward the rear face of the bars 39 and then in a direction away from the bars 39 as at 44. The extremities 45 of the portions 44 are bent back upon themselves and into the space between the bars 39 and the portions 44 of the bent portion. Suitable fastening clips 46—47 may be arranged on opposite sides of the bars 39 and a fastening device 48 in the form of a bolt may be provided which passes through the fastening devices 46—47 and the extremities 45 of the bent back portions 44.

With this improved construction it will be manifest that increased rigidity will be imparted to the bumper and at the same time the bumper will be of a resilient nature. The springs 20, in the form of the invention shown in Figure 1, and the spring portions 44 in the form of the invention shown in Figure 5, serve to re-enforce or brace the bars 15 and as the parts are rigidly connected together it will be manifest that the bumper will be of a trussed formation so that in the event that the bumper should receive an impact upon one of its extremities adjacent the loops or eyes 17, the bumper will be maintained against crushing and the bars 15 will yield sufficiently to overcome the impact of the object or other vehicle. At the same time a strain or bump exerted at one extremity of the bumper to deflect the same rearwardly will cause the opposite end of the bumper to be projected forwardly, and thereby assist in preventing damage to the bumper and vehicle.

Furthermore it will be noted that with this improved construction each of the spring members 20 engage the bumper bars 15 at two points resulting in what might be termed a four point re-enforcement, which greatly adds to the rigidity of the structure and which at the same time will not impair the resiliency of the bumper.

While the preferred forms of the invention have been herein shown and described it is to be understood that various changes may be made in the details of construction and in the combination and arrangement of the several parts, within the scope of the claims, without departing from the spirit of this invention.

What is claimed as new is:—

1. A bumper for vehicles including spaced spring bumper bars for extension across the vehicle, the ends of the bars being deflected towards each other, spring members disposed in the rear of said bars adjacent each end thereof, one end of each of the spring members being anchored to the bars adjacent one end thereof, the body of the spring member being bowed away from the said bars, the free end of each of the spring members being bent back upon itself and spaced from the body thereof, the bent back portion being disposed between the spring member and the rear face of the said bars, the extremity of the bent back portion of the spring member engaging the said bars, and anchoring means engaging the spring members intermediate the ends thereof.

2. A bumper for vehicles including spaced spring bumper bars for extension across the vehicle, the ends of the bars being deflected towards each other, means securing the extremities of said ends together, spring members disposed in the rear of said bars adjacent each end thereof, one end of each of the spring members being anchored to the bars adjacent one end thereof, the body of the spring members being bowed away from the said bars, the free end of each of the spring members being bent back upon itself and spaced from the body thereof, the bent back portion being disposed between the spring member and the rear face of the said bars, the extremity of the bent back portion of the spring member engaging the said bars, and anchoring means engaging the spring members intermediate the ends thereof.

3. A bumper for vehicles including spaced spring bumper bars for extension across the vehicle, the ends of the bars being deflected towards each other, spring members disposed in the rear of said bars adjacent each end thereof, one end of each of the spring members being anchored to the bars adjacent one end thereof, the body of the spring members being bowed away from the said bars, the free end of each of the spring members being bent back upon itself and spaced from the body thereof, the bent back portion being disposed between the spring member and the rear face of the said bars, the extremity of the bent back portion of the spring members engaging the said bars, means anchoring the last said extremity to the bumper bars, and anchoring means engaging the spring members intermediate the ends thereof.

4. A bumper for vehicles including spaced spring bumper bars for extension across the vehicle, the ends of the bars being deflected towards each other, spring members disposed in the rear of said bars adjacent each end thereof, one end of each of the spring members being anchored to the bars adjacent one end thereof, the body of the spring members being bowed away from the said bars, the free end of each of the spring members being bent back upon itself and spaced from the body thereof, the bent back portion being disposed between the spring member and the rear face of the said bars, the extremity of the bent back portion of the spring member engaging the said bars, hanger members, and anchoring means engaging the said spring members intermediate their ends and the said hanger members.

5. A bumper for vehicles including spaced spring bumper bars for extension across the vehicle, the ends of the bars being deflected towards each other, spring members disposed in the rear of said bars adjacent each end thereof, one end of each of the spring members being anchored to the bars adjacent one end thereof, the body of the spring member being bowed away from the said bars, the free end of each of the spring members being bent back upon itself and spaced from the body thereof, the bent back portion being disposed between the spring member and the rear face of the said bars, the extremity of the bent back portion of the spring member engaging the said bars, hanger members, a reenforcing member between the hanger and the spring members and spanning the latter, and anchoring means engaging the spring members intermediate their ends, the reenforcing and the hanger members.

6. A bumper for vehicles including spaced spring bumper bars for extension across the vehicle, the ends of the bars being deflected towards each other, spring members disposed in the rear of said bars adjacent each end thereof, one end of each of the spring members being anchored to the bars adjacent one end thereof, the body of the spring member being bowed away from the said bars, the free end of each of the spring members being bent back upon itself and spaced from the body thereof, the bent back portion being disposed between the spring member and the rear face of the said bars, the extremity of the bent back portion of the spring member engaging the said bars, and anchoring means engaging the spring members intermediate the ends thereof, the said spring members spanning the space between the said bumper members.

7. A bumper for vehicles including spaced co-planar spring bumper bars for extension across a vehicle, the ends of the bars being deflected towards and engaging each other, means securing the extremities of said ends together, spring members disposed in rear of the bumper bars adjacent the ends thereof, one end of each of the spring members being anchored adjacent one end of the bumper bars, the body of the spring members extending in a general direction parallel with the bumper bars and bowed away therefrom, the free ends of the spring members being bent back upon themselves and with the space between the spring members and the bumper bars, the extremities of the bent back portions engaging the rear face of the bumper bars, means passing through the space between the bumper bars for anchoring the ends of the spring members thereto, and anchoring means engaging the spring members intermediate the ends thereof.

8. A bumper for vehicles including spaced co-planar spring bumper bars for extension across a vehicle, the ends of the bars being deflected towards and engaging each other, means securing the extremities of said ends together, spring members disposed in rear of the bumper bars adjacent the ends thereof, one end of each of the spring members being anchored adjacent one end of the bumper bars, the body of the spring members extending in a general direction parallel with the bumper bars and bowed away therefrom, the free ends of the spring members being bent back upon themselves and into the space between the spring members and the bumper bars, the extremities of the bent back portions engaging the rear face of the bumper bars, means passing through the space between the bumper bars for anchoring the ends of the spring members thereto, a hanger adjacent the spring members, and anchoring means engaging the hanger members and the respective spring members intermediate the ends of the latter.

9. A bumper for vehicles including spaced co-planar spring bumper bars for extension across the vehicle, the ends of the bars being deflected towards each other, means connecting said ends, a spring in rear of and adjacent each end of the said bars, one end of the spring being connected with the bars, the body of the spring being bowed away from the bumper bars, the extremity of the spring being bent back upon itself and into the space between the body of the spring and the bumper bars, and means anchoring the said free end of the spring to the bumper bars.

10. A bumper for vehicles including spaced co-planar spring bumper bars for extension across the vehicle, the ends of the bars being deflected towards each other, means connecting said ends, a spring in rear of and adjacent each end of the said bars, one end of the spring being connected with the bars, the body of the spring being bowed away from the bumper bars, the extremity of the spring being bent back upon itself and into the space between the body of the spring and the bumper bars, and means anchoring the said free end of the spring to the bumper bars, a portion of the said anchoring means passing through the space between the bumper bars remote from the ends of the latter.

11. A bumper for vehicles including spaced co-planar spring bumper bars for extension across the vehicle, the respective outermost portions of the bars being deflected towards each other to form tapered ends, spring suspension means for the ends of the bars, and resilient means contacting with the rear faces of the bars intermediate their ends.

12. A bumper for vehicles including spaced co-planar spring bumper bars for extension across the vehicle, the respective outermost portions of the bars being deflected towards each other to form tapered ends, spring suspension means for the ends of the bars, and resilient means contacting with the bars in proximity to but spaced from each of the ends of the bars.

13. A bumper for vehicles including spaced co-planar spring bumper bars for extension across the vehicle, the respective outermost portions of the bars being deflected towards each other to form tapered ends, spring suspension means for the ends of the bars, resilient means contacting with the bars in proximity to but spaced from each of the ends of the bars, and means anchoring the said suspension and resilient means to the bars.

14. A bumper for vehicles including spaced co-planar spring bumper bars for extension across the vehicle, the respective ends of the bars being deflected towards each other, spring suspension means for the ends of the bars, resilient means contacting with the bars in proximity to but spaced from each of the ends of the bars, and means anchoring the said suspension and resilient means to the bars, the said suspension means extending across the space between the bars.

In testimony whereof I have signed my name to this specification, on this 25th day of June, A. D. 1924.

IRA D. PERRY, Jr.